United States Patent [19]

Woo et al.

[11] Patent Number: 4,778,862

[45] Date of Patent: Oct. 18, 1988

[54] FLUORINE AND ACRYLIC MODIFIED SILICONE RESINS

[75] Inventors: James T. K. Woo, Medina; Richard M. Marcinko, Royalton, both of Ohio

[73] Assignee: The Glidden Company, Cleveland, Ohio

[21] Appl. No.: 7,505

[22] Filed: Jan. 28, 1987

[51] Int. Cl.$^4$ .................... C08F 283/12; C08G 77/04
[52] U.S. Cl. ........................ 525/479; 528/26; 528/29; 525/474
[58] Field of Search .................. 525/479, 474; 528/26, 528/36, 29

[56] References Cited

U.S. PATENT DOCUMENTS

| | | | |
|---|---|---|---|
| 3,650,812 | 3/1972 | Nordstrom | 528/26 |
| 4,472,484 | 9/1984 | Vasta | 428/421 |
| 4,554,296 | 11/1985 | Keil | 525/474 |

FOREIGN PATENT DOCUMENTS 1200111  9/1986  Japan ..................... 528/26

*Primary Examiner*—John C. Bleutge
*Assistant Examiner*—Ralph H. Dean, Jr.
*Attorney, Agent, or Firm*—Thomas M. Schmitz

[57] ABSTRACT

A fluorinated-silicone-acrylic terpolymer useful as a binder in powder coatings is prepared by step-wise synthesis. The process comprises reacting silicone resin with a fluorinated component to produce a fluorinated silicone resin followed by further reaction with hydroxylated acrylic prepolymer to form the flourinated-silicone-acrylic terpolymer.

7 Claims, No Drawings

FLUORINE AND ACRYLIC MODIFIED SILICONE RESINS

BACKGROUND OF THE INVENTION

This invention relates to fluorine and acrylic modified silicone resin useful in powder coatings and particularly to a process and composition based on sequential reaction of a coreative fluorinated compound with silicone resin followed by coreaction with a reactive acrylic polymer.

Acrylic resins are known to be useful in powder coatings and to exhibit good weathering properties if the acrylic polymer does not contain appreciable amounts of copolymerized styrene. Acrylic copolymers of silicone resin should provide substantially improved weathering properties with silicone resins. However, attempting to coreact acrylic copolymers with silicone resins is difficult to achieve in practice since the reaction is difficult to control and often results in cross-linked polymers known as gels. The reaction is difficult to control due to hydroxyl groups or other functional groups on the acrylic polymer as well as the preponderance of hydroxyl groups or alkyl ether groups on silicone resin, which coreact to cause a gel during synthesis or subsequently during a solvent stripping step.

It now has been found that step-wise synthesis of a fluorinated-silicone-acrylic copolymer resin provides superior weatherability properties as well as advantageously avoiding the gellation problem occurring in the formation of acrylic-silicone polymers. In accordance with this invention, the fluorinated-silicone-acrylic terpolymer is produced in step-wise processing, wherein the silicone resin is first reacted with a fluorinated reactant such as fluorinated alcohol to produce a fluorinated silicone resin followed by reaction with a hydroxylated acrylic polymer to form a fluorinated-silicone-acrylic resin. The hydroxylated acrylic polymer can be preformed or formed in-situ in the presence of the fluorinated-silicone resin. The resulting polymer is particularly useful as a polymeric binder in powder coatings and forms a film in use particularly exhibiting superior weathering properties as well as other advantageous film integrity properties. These and other advantages of this invention will become more apparent by referring to the detailed description and illustrative examples.

SUMMARY OF THE INVENTION

Briefly, the invention pertains to a fluorinated-silicone-acrylic polymer produced by a step-wise synthesis process comprising the coreaction of a hydroxylated fluorine compound with silicon to produce a fluorinated-silicone resin followed by further reaction with a preformed hydroxylated acrylic polymer.

DETAILED DESCRIPTION OF THE INVENTION

The composition and process of this invention pertains to coreacting together fluorinated compounds, silicone resin, and acrylic polymer to form a fluorinated-silicone-acrylic polymer.

Referring first to the fluorinated compounds, preferred fluorine components are hydroxylated fluorines comprising polyfluoro substituted alcohols such as fluorinated alkyl alcohol or fluorinated aliphatic alcohol wherein the alcohol contains one or more flourine atoms substituted in the alkyl chain or on the aliphatic ring. Preferred fluorinated alcohols contain at least two substituted fluorine atoms per molecule where preferred alkyl alcohols contain lower alkyl chains having 1-12 carbon atoms and 2-25 substituted fluoro atoms depending on the alkyl chain length. For example, heptafluoro butanol and trifluoroethane provide desirable polyfluoro substituted alkyl alcohols. Other useful substituted alkyl alcohols can include, for example 1H,1H,7H-dodecafluoro-1-heptanol; 1H,1H,11H-Eicosafluoro-1-unidecanol; 3,3,4,4,5,5,5-heptafluoropentanol-2; hexafluoro isopropanol; hexafluoro-2-methyl-isopropanol; hexafluoro-2-(p-tolyl) isopropanol; 1H,1H,5H-octafluoro-1-pentanol; 1H,1H-pentadecafluoro octanol-1; 3,3,4,4,4-pentafluorobutanol-2; and N-ethyl-N-2-hydroxylethyl perfluoro octanesulfornamide. Monoalcohols are preferred although diols can be used. Diols produce a polymeric silicone resin comprising two or more units of hydroxylated silicone resins. The fluoro substituted alcohol is coreacted with silicone resin by etherification through coreactive hydroxy groups of both reactants.

Referring now to the silicone resins useful in this invention, silicone resins are based on a chemical backbone structure comprising alternate silicon and oxygen atoms, where methyl groups primarily or other lower alkyl groups or phenyl groups are attached to the silicon atoms, provided that hydroxyl groups (silanol groups) or lower alkyl ether (methoxy silane groups) are available and attached to silicon atoms for curing purposes. Silicone resins are prepared from organochlorosilanes such as methyltrichlorosilane, phenyltrichlorosilane, and dimethyldichlorosilane, which can be coreacted with an organic halide such as methyl chloride or chlorobenzene in the presence of silicon and copper catalyst to produce chlorosilanes which can be further reacted with water to form hydroxysilanes and dehydrolysis to eventually organopolysiloxanes (silicones). Silicone resin have the generalized structure:

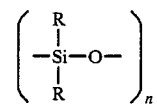

wherein most commercial silicons the R=methyl, but can include lower alkyl, fluoroalkyl, phenyl, vinyl and as part of the silicone resin polymer can include hydrogen, chlorine, alkoxy, acyloxy, or alkylamino groups; and where n represents monofunctional, difunctional, trifunctional, and quadrafunctional monomer units in the silicone polymer. Useful silicone resins in accordance with this invention have a number average molecular weight above 500 and preferably between 600 and 8,000 and have more than 1, most preferably more than 2, hydroxy(silanol) groups and/or alkyl ether (methoxy silane) groups per Si atom and preferably between 1 and 3 silanol and/or methoxy silane groups including fractions per Si atom. Molecular weights can be determined by gel permeation chromatography (GPC) in accordance with ASTM D3016-72, ASTM D3536-76, ASTM D3593-80, and/or ASTM 3016-78.

As noted before, the silicone resin having active hydroxyl groups are coreacted with the fluoro-substituted alcohols to produced a fluorinated-silicone resin. The silicon resin contains at least a 10% equivalent excess of reactive hydroxyl groups relative to the fluoro-substituted alcohols to provide excess unreacted silanol or methoxy silane groups on the fluoro-silicone resin which in turn are available for further coreaction with hydroxylated acrylic polymer.

Referring next to the hydroxylated acrylic polymer, such acrylic polymer can be preformed or preferably formed in-situ by copolymerizing monomers in the presence of the fluorinated-silicone resins. The acrylic polymer comprises copolymerized ethylenically unsaturated monomers, including acrylic and hydroxylated monomers, to produce a hydroxylated acrylic polymer. Ethylenically unsaturated monomers contain carbon-to-carbon unsaturation and include vinyl monomers, acrylic monomers, allylic monomers, acrylamide monomers, and mono- and dicarboxylic unsaturated acids. Vinyl monomers include vinyl esters, vinyl acetate, vinyl propionate, vinyl butyrates, vinyl benzoates, vinyl isopropyl acetates and similar vinyl esters; vinyl halides such as vinyl chloride, vinyl fluoride, and vinylidene chloride; vinyl aromatic hydrocarbons such a styrene, methyl styrenes and similar lower alkyl styrenes, chlorostyrene, vinyl toluene, vinyl naphthalense, divinyl benzoate, and cyclohexene; vinyl aliphatic hydrocarbon monomers such as alpha olefins such as ethylene, propylene, isobutylene, as well as conjugated dienes such as 1,3 butadiene, methyl-2-butadiene, 1,3-piperylene, 2,3 dimethyl butadiene, isoprene, cyclopentadiene, and dicyclopentadiene; and vinyl alkyl ethers such as methyl vinyl ether, isopropyl vinyl ether, n-butyl vinyl ether, and isobutyl vinyl ether. Acrylic monomers include monomers such as lower alkyl esters of acrylic or methacrylic acid having an alkyl ester portion containing between 1 to 12 carbon atoms as well as aromatic derivatives of acrylic and methacrylic acid. Useful acrylic monomers include, for example, acrylic and methacrylic acid, methyl acrylate and methacrylate, ethyl acrylate and methacrylate, butyl acrylate and methacrylate, propyl acrylate and methacrylate, 2-ether hexyl acrylate and methacrylate, cyclohexyl acrylate and methacrylate, decyl acrylate and methacrylate, isodecylacrylate and methacrylate, benzyl acrylate and methacrylate, and various reaction products such as butyl, phenyl, and cresyl glycidyl ethers reacted with acrylic and methacrylic acids, hydroxyl alkyl acrylates and methacrylates such as hydroxyethyl and hydroxypropyl acrylates and methacrylate, as well and amino acrylates and methacrylates. Acrylic acids include acrylic and methacrylic acid, ethacrylic acid, alpha-chloroacrylic acid, alpha-cycanoacrylic acid, crotonic acid, beta-acryloxy propionic acid, and beta-styrl acrylic acid. N-alkylol amides are acrylamides or methacrylamides such as N-methylol acrylamide, N-ethanol acrylamide, N-propanol acrylamide, N-methylol methacrylamide, N-ethanol methacrylamide, and similar alkyl acrylamide or methacrylamide monomers containing methyl, ethyl, propyl, n-butyl or isobutyl alkyl groups.

In accordance with this invention, hydroxyl monomers are included at a level above 10% by weight of the total copolymerized monomers to provide subsequent coreaction with the silicone resin. Hydroxyl functional monomers are hydroxy containing ethylenically unsaturated monomers including hydroxy alkyl acrylates such as 2-hydroxy ethyl acrylate and methacrylate, 2-hydroxypropyl acrylate and methacrylate, and similar hydroxy alkyl acrylates. The acrylic polymer preferably comprises copolymerized monomers by weight between 30% and 95% acrylic monomers, between 1% and 50% hydroxyl monomers with the remaining being other ethylenic monomers.

The resulting fluorinated-silicone-acrylic polymer comprises on a weight basis betwen 1% and 10% copolymerized fluorinated alcohol, between 10% and 50% copolymerized silicone resin, and between 40% and 90% copolymerized acrylic polymer.

In accordance with the process of this invention, fluorinated silicone resin is dispersed into an organic solvent such as aromatic hydrocarbons such as xylene, toluene, benzene, or aliphatic hydrocarbons or derivatives thereof such as chlorinated hydrocarbons, esters, or ketones. To provide solubility for the subsequent addition of ethylenic monomers for in-situ polymerization, the aliphatic or aromatic hydrocarbons can be mixed with alkyl alcohols such as methanol, ethanol, propanol, butanol as well as other solvents such ethylene glycol, monobutyl ether, ethylene glycol monobutyl ether acetate, and hexane. Solvents similarly will expedite the solubility of the preformed acrylic polymer.

The solvated fluorinated silicone resin is then heated to temperatures preferably between about 50° C. and 150° C., depending on the solvents and monomers as well as the polymerization initiator and the stage of the copolymerization of monomers. The ethylenically unsaturated monomers are then added to the heated solvated silicone resin over a period of time to effect in-situ copolymerization of the monomers in the presence of fluorinated silicone resin. Suitable initiators for promoting copolymerization of the monomers include, for example, hydrogen peroxide, ammonium persulfate, sodium persulfate, or potassium persulfate. The peroxide catalyst is effectively coupled with a reducing agent such as an alkali metal sulfite, bisulfite, or metabisulfite, or hydrosulfite or hydrazine. Other suitable initiators include organic or inorganic azo catalysts, such as azodiisobutyronitrile, azodiisobutyramide, or diethyl azodiisobutyrate. Examples of other suitable azo catalysts include dimethyl or dibutyl azodiisobutyrate, azobis(alpha-dimethylvaleronitrile), azobis(alphamethylbutyronitrile), azo-bis(alpha-methylvaleronitrile), dimethyl or diethyl azobismethylvalerate, and the like. Preferred such initiators comprise the persulfates, such as potassium persulfate, sodium persulfate, ammonium persulfate, and the like. Another useful class of initiators comprises percarbonates, such as diisopropyl percarbonate, and the like. Another useful class of initiators for this in-situ polymerization comprises organic peroxides. One group of suitable peroxides comprises diacyl peroxides such as benzoyl peroxide, lauroyl peroxide, acetyl peroxide, caproylperoxide, butyl perbenzoate,2,4-dichloro benzoyl peroxide, p-chlorobenzoyl peroxide, and the like. Another group comprises ketone peroxides, such as methyl ethyl ketone peroxide and the like. Another group comprises alkyl hydroperoxides such as t-butyl hydroperoxide, and the like.

After the copolymerization of the monomers is completed, the formed polymer mixture comprises a fluorine modified acrylic-silicone polymer. Solvent, if any, can be stripped off without causing gellation to provide an exceptionally good binder useful in powder coatings.

The fluorine-acrylic-silicone polymeric binder of this invention can be thoroughly and uniformly mixed with raw batch ingredients by homogenizing the binder, pigmentary solids, plasticizers and other components to uniformly blend the resinous binder with the pigmentary solids. Pigments can oridinarily include opacifying pigments such as titanium dioxide, zinc oxide, leaded zinc oxide, titanium calcium, as well as tinting pigment such as carbon black, yellow oxides, brown oxides, tan oxides, raw and burnt sienna or umber, chrominum oxide green, phthalocyanine green, phthalonirile blue, ultramarine blue, cadmium pigments, chromium pigments, and the like. Filler pigments such as clay, silica, talc, mica, woolastonite, wood flower and the like can be added. The raw batch ingredients can be thoroughly mixed in a high intensity mixer such as a frustroconical agitator whereby the materials are discharged in a uniform mixture. The high intensity mixer discharges the batch components to a heated screw extruder. The extrudate emerges from the extruder as a ribbon of less than about 1/16 inch thickness which passes onto a water cooled stainless steel conveyor belt whereby the plastic ribbon extrudate fully hardens. The cooled extrudate then passes through a mechanical commuter dicharged at the end of the cooled stainless steel belt to efficiently break the fragile brittle ribbon into very small flakes. The small flakes are then discharged onto a cooled mill, such as a hammer mill, to grind the small particles onto powder paint of less than 325 mesh and preferably passing a 200 mesh U.S. Standard sieve screen whereupon the powder can be further classified into particle size if desired.

The powder paints in accordance with this invention can be applied to a steel panel substrate and moderately heated between temperatures of about 80° C. and 100° C. to obtain desirable flow out.

The merits of this invention are further illustrated by the following illustrative examples where percentages are weight percent temperatures are °C., unless otherwise indicated.

EXAMPLE 1

Reaction product of Z-6018 with 2,2,2-trifluoroethanol. Z018 is a hydroxy functional, low molecular weight silicone resin.

To a 3-liter round bottomed flask was charged 210 g. of toluene which was heated to 67° C. Then 530 g. of Z-6018 was added and dissolved in the toluene, and temperature stabilized at 70° C. 100 grams of 2,2,2-trifluoroethanol was then added and heating resumed. Water from etherification reaction started coming over. When the temperature is raised to 83° C., some of the 2,2,2-trifluoroethanol (B.P. 90° C.) started coming out and is collected in the Dean-Stark trap, and the water layer disappeared and water is miscible with the fluorinated alcohol. Reaction is stopped at this time.

EXAMPLE 2

Reaction product of Z-6018 with hydrafluorobutanol.

Into a 2 liter round bottom flask was charged 150 g. of toluene, 150 g. of Z-6018 (0.11 mole) and 24 g. (0.12 mole) of heptafluorobutanol. The reaction mixture was heated to reflux (109° C.) and after 4 hours of heating, 1 ml of water was collected in the Dean-Stark trap, indicating that majority of the etherification reaction has taken place.

EXAMPLE 3

Preparation of grafted fluorinated silicone acrylic copolymer.

To the reaction product in Example 2, was now added 130.5 g. of HPMA, 253.7 g. of MMA, 76.5 g. of BA, 56.3 g. of styrene, 4.96 of methacrylic acid, 4.96 g. of mercaptoethanol and 10.4 g. of VAZO 64 (polymerization initiator, 2-methyl propane nitrile, 2,2-azobis). The monomer mixture was added in 3 hours, and the reaction was held at 114° C. for 3 more hours, and then a vacuum was applied to strip off solvent. After most of the solvent was stripped, the viscous resin was poured onto an aluminum foil. The ICI cone-plate viscosity of the resin is 38 poise at 200° C., acid number of resin is 7.2 and the tack temperature is 204° F. Number average molecular weight (Mn) is determined by gel permeation chromatography (GPC) is 4160, the weight average molecular weight (Mw) is 12,900, and Mw/Mn=3.10.

The foregoing description and illustrative examples describe the composition and process of this invention for producing a fluorinated acrylic silicone polymer, but is not intended to be limiting except by the appended claims.

We claim:

1. In a process for producing a paint coating composition containing a polymeric binder comprising a fluorinated-silicone-acrylic polymer, the process steps for preparing the polymeric binder comprising:

reacting a silicone resin comprising a silicone molecule with a coreactive fluorinated alcohol to produce a fluorinated silicone molecule, where said silicone molecule has a number average molecular weight above 500 and contains an average of at least two reactive groups per silicone molecule selected from hydroxy or methoxy groups, where said reactive groups are coreactive with the alcohol groups on the fluorinated alcohol, and where the silicone molecule contains at least 10% excess equivalent reactive groups relative to the coreactive alcohol groups on the fluorinated alcohol; and reacting the fluorinated-silicone molecule by in-situ copolymerization with ethylenically unsaturated monomers comprising by weight between 30% and 95% acrylic monomers, between 1% and 50% hydroxyl monomers, with the balance being other ethylenically unsaturated monomers to produce an in-situ formed fluorinated-silicone-acrylic terpolymer comprising by weight between 1% and 10% copolymerized fluorinated alcohol, between 10% and 50% copolymerized silicone resin, and between 40% and 90% copolymerized acrylic polymer; and using the fluorinated-silicone-acrylic terpolymer as a polymeric binder in a coating composition.

2. The process in claim 1 wherein said reactive groups are hydroxy groups.

3. The process in claim 1 wherein said reactive groups are methoxy groups.

4. The process in claim 1 wherein the silicone molecule contains a mixture of hydroxy and methoxy groups.

5. The process in claim 1 wherein the fluorinated-silicone-molecule is dispersed into organic solvent prior to in-situ polymerization of the ethylenically unsaturated monomers.

6. A paint coating composition containing a binder comprising a non-gelled, stabilized fluorinated-silicone-acrylic terpolymer on a weight basis between 1% and 10% copolymerized fluorinated alcohol, between 10% and 50% copolymerized silicone resin, and between 40% and 90% copolymerized acrylic polymer, where the terpolymer is produced in accordance with claim 1.

7. The paint coating composition in claim 6 where the coating comprises a powder coating.

* * * * *